United States Patent
Li et al.

(10) Patent No.: US 10,961,109 B2
(45) Date of Patent: Mar. 30, 2021

(54) FLUID BYPASS METHOD AND SYSTEM FOR CONTROLLING THE TEMPERATURE OF A NON-PETROLEUM FUEL

(71) Applicants: CHINA ENERGY INVESTMENT CORPORATION LIMITED, Beijing (CN); NATIONAL INSTITUTE OF CLEAN-AND-LOW-CARBON ENERGY, Beijing (CN)

(72) Inventors: Xianming Jimmy Li, Mountain View, CA (US); Edward Youn, Mountain View, CA (US); Jeff Pickles, Mountain View, CA (US); Surinder Singh, Mountain View, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 0 days.

(21) Appl. No.: 16/532,682

(22) Filed: Aug. 6, 2019

(65) Prior Publication Data
US 2020/0156923 A1    May 21, 2020

Related U.S. Application Data

(60) Provisional application No. 62/768,151, filed on Nov. 16, 2018.

(51) Int. Cl.
*B67D 7/04* (2010.01)
*B67D 7/36* (2010.01)
(Continued)

(52) U.S. Cl.
CPC ............ *B67D 7/04* (2013.01); *B67D 7/08* (2013.01); *B67D 7/36* (2013.01); *B67D 7/38* (2013.01); *B67D 7/78* (2013.01); *B67D 7/82* (2013.01)

(58) Field of Classification Search
CPC ... B67D 7/04; B67D 7/08; B67D 7/36; B67D 7/38; B67D 7/78; B67D 7/82;
(Continued)

(56) References Cited

U.S. PATENT DOCUMENTS 5,505,232 A    4/1996  Barclay
5,687,776 A   11/1997  Forgash et al.
(Continued)

FOREIGN PATENT DOCUMENTS

CN    1805876 A    7/2008
CN    207648457 U  7/2018
(Continued)

OTHER PUBLICATIONS

International Search Report and Written Opinion in corresponding PCT Application No. PCT/CN2019/117317, dated Feb. 6, 2020.

*Primary Examiner* — Timothy P. Kelly
*Assistant Examiner* — Christopher M Afful

(57) ABSTRACT

A fluid bypass method for controlling the temperature of a non-petroleum fuel, the fluid bypass method includes: providing a fuel at a pressure sufficient to effect a desired flow rate to a vehicle, the fuel being at a liquid or substantially supercritical thermodynamic state requiring further heat addition in a vaporizer; and diverting a bypass stream with partial or no vaporization to a heat exchanger as a cold fluid on a cold side of the heat exchanger. The method further includes providing a remainder stream of the fuel to the vaporizer; mixing the remainder stream outflowed from the vaporizer with the cold fluid outflowed from the cold side of (Continued)

the heat exchanger to form a combined fuel stream; and providing the combined fuel stream to the heat exchanger as a warm fluid on a warm side of the heat exchanger.

15 Claims, 4 Drawing Sheets

(51) Int. Cl.
*B67D 7/08* (2010.01)
*B67D 7/78* (2010.01)
*B67D 7/82* (2010.01)
*B67D 7/38* (2010.01)

(58) Field of Classification Search
CPC ........ B60Y 2400/102; B60Y 2400/434; F01N 2610/04; F01N 2560/024; F01N 2570/24; F01K 25/005; F02M 21/0206; F02M 25/10; F02M 25/12; F02M 2700/4321; F02D 19/0644; F02D 2041/147; F04C 2210/224; F04C 2210/1055; F04B 2015/0822; F05B 2220/61; F17C 2221/012; F17C 5/04; F17C 11/005; F17C 5/02; F17C 5/06; F17C 7/04; F17C 2265/065; F17C 2227/0393; F17C 2227/034; F23C 2900/9901; F25J 2215/10; F25J 1/001; F25J 1/0067; F25J 1/02; F25J 1/0201; F25J 1/0211; F25J 1/0221; F25J 1/0222; F25J 1/0223; F25J 1/0224; F25J 1/0225; F25J 1/0227; F25J 1/0228; F25J 1/0229; F25J 1/023; F25J 1/0231; F25J 1/0232; F25J 1/0234; F25J 1/0235; F25J 1/0236; F25J 1/0237; F25J 1/0238; F25J 1/0239; F25J 1/0241; F25J 1/0242; F25J 1/0243; F25J 1/0244; F25J 1/0245; F25J 1/0247; F25J 1/0248; F25J 1/0249; F25J 1/025; F25J 1/0251; F25J 1/0252; F25J 1/0254; F25J 1/0255; F25J 1/0256; F25J 1/0257; F25J 1/0258; F25J 1/0259; F25J 1/0261; F25J 1/0262; F25J 1/0263; F25J 1/0264; F25J 1/0265; F25J 1/0267; F25J 1/0268; F25J 1/0269; F25J 1/027; F25J 1/0271; F25J 1/0272; F25J 1/0274; F25J 1/0275; F25J 1/0276; F25J 1/0277; F25J 1/0278; F25J 1/0279; F25J 1/0281; F25J 1/0282; F25J 1/0283; F25J 1/0284; F25J 1/0285; F25J 1/0287; F25J 1/0288; F25J 1/0289; F25J 1/029; F25J 1/0291; F25J 1/0292; F25J 1/0294; F25J 1/0295; F25J 1/0296; F25J 1/0297; F25J 1/0298; F25J 3/0252

See application file for complete search history.

(56) References Cited

U.S. PATENT DOCUMENTS

| | | | |
|---|---|---|---|
| 5,954,101 | A | 9/1999 | Drube et al. |
| 6,619,336 | B2 | 9/2003 | Cohen et al. |
| 2004/0250871 | A1 | 12/2004 | Bingham et al. |
| 2012/0159970 | A1 | 6/2012 | Reese et al. |
| 2012/0216915 | A1 | 8/2012 | Takata et al. |
| 2018/0306381 | A1* | 10/2018 | Fujisawa ................ B67D 7/58 |

FOREIGN PATENT DOCUMENTS

| | | |
|---|---|---|
| DE | 102016009672 A1 | 2/2018 |
| EP | 2175187 A2 | 4/2010 |
| JP | 2018047753 A | 3/2018 |
| KR | 20130133540 A | 12/2013 |
| KR | 101559316 B1 | 10/2015 |

* cited by examiner

FLUID BYPASS METHOD AND SYSTEM FOR CONTROLLING THE TEMPERATURE OF A NON-PETROLEUM FUEL

CROSS REFERENCE TO RELATED APPLICATIONS

This application claims the benefit of U.S. provisional application No. 62/768,151, filed Nov. 16, 2018, titled "FLUID BYPASS METHOD AND SYSTEM FOR CONTROLLING THE TEMPERATURE OF A NON-PETROLEUM FUEL," which is incorporated herein by reference.

FIELD

The present disclosure relates to a pressurized gas or fuel dispensing system and more particularly to a pressurized gas or liquid dispensing system that includes a bypass method and system for controlling the temperature of a non-petroleum fuel, e.g., hydrogen or natural gas.

BACKGROUND

In the prior art technologies, a hydrogen refueling station (HRS) is provided that has storage tanks for storing liquid hydrogen as fuel. The tanks typically use an electrically-powered refrigeration system in combination with a thermal heat exchanger (HX) to maintain the temperature of the thermal storage below −40° C. for 24 hours per day in order for the fuel to be ready at the proper temperature when a vehicle needs re-filling. Such thermal storage and heat exchanger (HX) systems, however, are limited in the number of vehicles that are to be filled back-to-back due to the limited availability of thermal energy in the thermal storage and heat exchanger system for cooling the fuel, and must be tuned to a narrow range of ambient temperatures, vehicle types, and tank capacities in order to fill vehicles back-to-back. For example, the thermal heat exchangers (HXs) are physically large blocks of aluminum with high pressure hydrogen lines, where the refrigeration and cold hydrogen lines are cast into the aluminum. These "cold blocks" store cold temperatures to be available when a vehicle is filled up. Even when refrigeration is used constantly to maintain the cold block at −40° C. or lower, it is still impossible to maintain all the system piping at the desired target temperature, therefore, it takes time to cool down the pipe network before the nozzle temperature reaches the desired target temperature.

That is, in the methods in the prior art technologies, the methods and systems respond slowly and take up to 30 seconds to reach the desired temperature target and typically have a wide range of temperatures in which the cold block is maintained, e.g., from −20° C. to −39° C., that changes due to weather, time of year and number of back-to-back fill ups. The result is that customers generally receive less than a full tank of fuel due to the temperature fluctuations, thus less amounts of hydrogen are sold and shorter ranges for the fuel cell vehicles are provided.

Additionally, poor temperature control is also a significant contributor to station operation and maintenance cost. When the system is unable to maintain the correct temperature range, a technical team must go to the station and tune the thermal system based on data and use a test tank to verify that the tuning has improved the performance. Often this process can take multiple days and may result in the station being closed during this process, which leads to downtime and costs.

In order to overcome some of such deficiencies, the prior art uses various systems and methods for controlling the temperature of the fuel. For example, U.S. Pat. No. 6,619,336 B2 discloses a refrigeration system for cooling the gas exiting the pressurized gas source prior to the gas entering the receiving tank. The refrigeration system may use a mechanical refrigeration cycle, for example, a refrigeration system that uses a hydrofluorocarbon that is compressed and recirculated. Alternatively, the refrigeration system may include a liquid hydrogen source and a cold storage device, where the cold storage device is cooled by the liquid hydrogen from the liquid hydrogen source. The refrigeration system also includes a heat exchanger adapted to receive and cool the gas exiting the pressurized gas source prior to the gas flowing to the receiving tank. The cold storage device may also use a condensable refrigerant to store the thermal energy until cooling is needed when filling the receiving tank, where the refrigerant can again be a hydrofluorocarbon or use a compressed gas such as argon or nitrogen. The refrigeration system may include a refrigerated container that at least partially surrounds the pressurized gas source. However, the method for cooling hydrogen described in U.S. Pat. No. 6,619,336 B2 has several problems as follows:

(1) Fixed thermal storage systems only work for a fixed number of back-to-back (B2B) vehicles, then it can no longer continue to fill vehicles until the refrigeration system cools the system down again, where most thermal storage systems can fill 4 to 6 vehicles back to back.

(2) The cooling capacity of the refrigeration system is not robust enough, e.g., is lower than needed, for the continuous back-to-back filling of vehicles, so it is not possible to fill vehicles continuously.

(3) Refrigeration requires electrical usage 24 hours a day, 7 days a week to maintain thermal storage below −40° C., and is, therefore, costly.

(4) The thermal heat exchanger HX surface area is fixed, therefore, the thermal storage is fixed, and the refrigeration capability is relatively small compared to the load, so that it results in needing to tune the refrigeration setpoints based on ambient conditions and other site-specific changes such as length of pipes, which results in long commissioning time, high labor cost, and individualized HRS software/hardware configurations.

(5) Thermal storage is tuned to one small range of vehicle tank sizes and is not flexible for smaller or larger tank ranges. For example, a temperature control unit (TCU) designed for fueling a light duty vehicle is not compatible with fueling a bus and vice versa due the differing amounts of fuel required, which has different cooling requirements.

(6) The temperature control unit footprint is physically large and must be installed in a pit adjacent to the dispenser, where the land used at the station is typically at a premium since the TCU footprint limits how many and how close together dispensers can be.

In summary, the prior art temperature control unit creates a vehicle-specific dispenser that limits the commercialization and scale-up of hydrogen fuel applications.

SUMMARY

The present disclosure solves the deficiencies of the prior art by providing improvements over the prior art methods and systems in several ways.

In one embodiment, a fluid bypass method for controlling the temperature of a non-petroleum fuel, comprises: providing a fuel at a pressure sufficient to effect a desired flow rate to a vehicle, the fuel being at a liquid or substantially supercritical thermodynamic state requiring further heat addition in a vaporizer; diverting a bypass stream with partial or no vaporization forming a colder stream; providing a remainder stream of the fuel to the vaporizer; mixing the remainder stream outflowed from the vaporizer with the colder stream to form a combined fuel stream; providing the combined fuel stream for fueling a vehicle.

In another embodiment, a fluid bypass method for controlling the temperature of a non-petroleum fuel, comprises: providing a fuel at a pressure sufficient to effect a desired flow rate to a vehicle, the fuel being at a liquid or substantially supercritical thermodynamic state requiring further heat addition in a vaporizer; diverting a bypass stream with partial or no vaporization to a heat exchanger as a cold fluid on a cold side of the heat exchanger; providing a remainder stream of the fuel to the vaporizer; mixing the remainder stream outflowed from the vaporizer with the colder stream outflowed from the cold side of the heat exchanger to form a combined fuel stream; providing the combined fuel stream to the heat exchanger as a warm fluid on a warm side of the heat exchanger; where the cold stream outflowed from the heat exchanger is the bypass stream which is now a part of the combined fuel stream on the warm side of the heat exchanger.

In yet another embodiment, a system is provided for controlling the temperature of a non-petroleum fuel, the system includes: a pump configured to provide a fuel at a pressure sufficient to effect a desired flow rate to a vehicle, wherein the fuel is at a liquid or substantially supercritical thermodynamic state requiring further heat addition in a vaporizer, a bypass valve configured to divert a bypass stream with partial or no vaporization through a bypass line to a heat exchanger as a cold fluid on a cold side of the heat exchanger, the vaporizer configured to receive a remainder of the fuel, where, the remainder stream outflowed from the vaporizer is mixed with the cold fluid outflowed from the cold side of the heat exchanger to form a combined fuel stream; the heat exchanger configured to receive the cold fluid on the cold side and receive the combined fuel stream, which is provided to the heat exchanger as a warm fluid, on a warm side to exchange heat, where the cold fluid outflowed from the heat exchanger is the bypass stream which is now a part of the combined fuel stream on the warm side of the heat exchanger.

BRIEF DESCRIPTION OF THE DRAWINGS

The accompanying drawings herein are used to provide further understanding of the disclosure and constitute a part of the description. The accompanying drawings together with the following embodiments serve to explain the disclosure, but do not constitute a limitation to the disclosure. In the accompanying drawings.

Figure 1A:
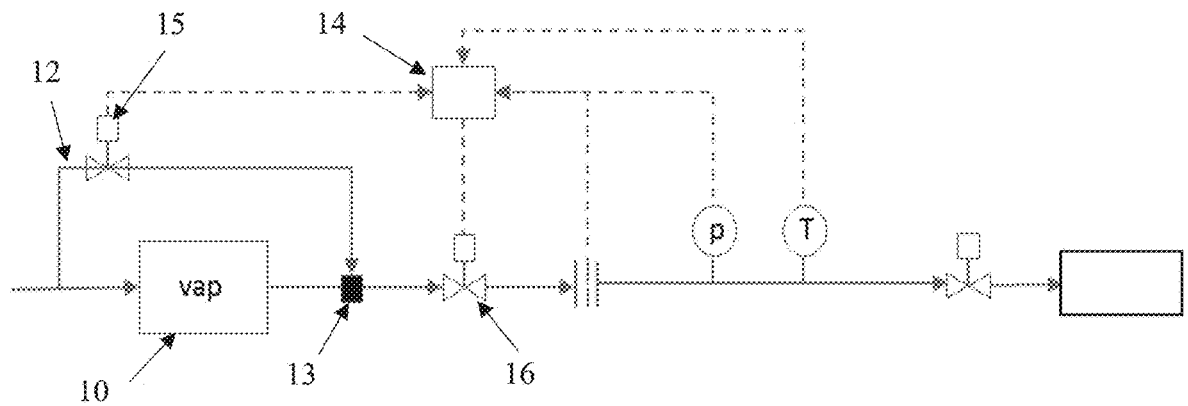
FIG. 1A is a schematic diagram of a temperature control system in a first embodiment.

In the various figures, similar elements are provided with similar reference numbers. It should be noted that the drawing figures are not necessarily drawn to scale, or proportion, but instead are drawn to provide a better understanding of the components thereof, and are not intended to be limiting in scope, but rather provide exemplary illustrations.

DETAILED DESCRIPTION

As seen in FIG. 1A, in one embodiment, a bypass line and bypass control valve are provided around a vaporizer to tune the temperature of the fuel stream to the exact temperature needed for the type of vehicle being filled which can be detected by the dispenser during a startup sequence. The system is allowed to automatically regulate the dispensed fuel temperature and maintain the ideal temperature throughout the fueling cycle, which includes at least the startup sequence, minimum fueling sequence, termination sequence, leak check sequence, etc.

Specifically, FIG. 1A illustrates using a vaporizer 10, where a bypass stream 12 is diverted upstream of the vaporizer 10 to a point downstream of the vaporizer 10, where the bypass stream 12 is directly mixed with the vaporizer outlet stream, e.g., via mixer 13. The amount of the bypass stream 12 is controlled by controller 14 which controls valves 15, 16 so that the desired temperature, pressure, and flow rate, e.g., in the range of −20° C. to −40° C. and 20 MPa to 100 MPa, is achieved. Once the desired temperature is achieved, the fuel stream can then be dispensed to a vehicle via a nozzle.

Figure 1B:
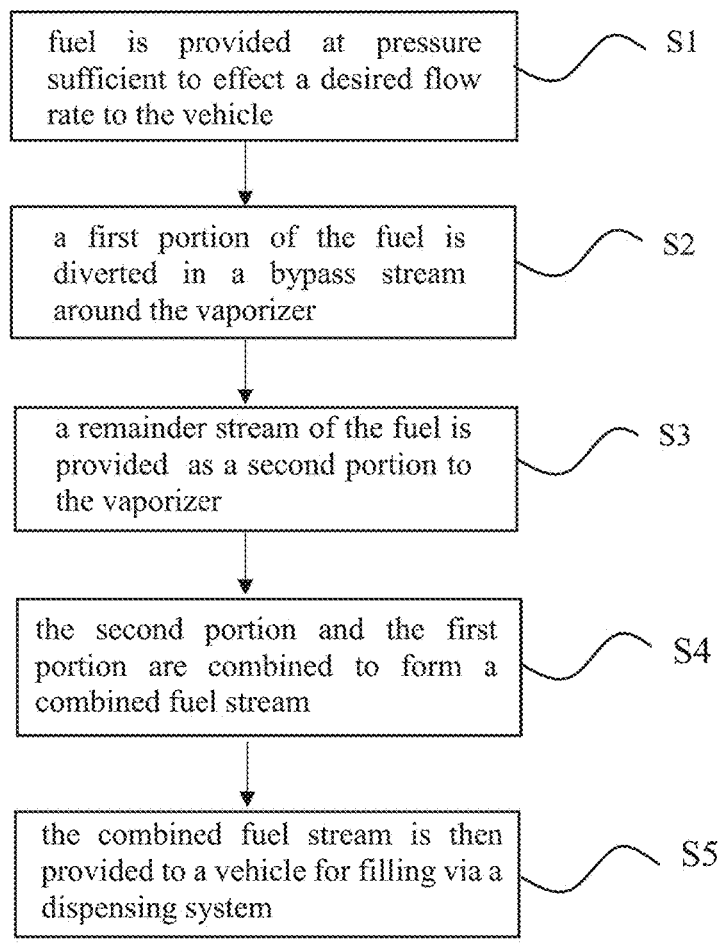
FIG. 1B is a flow chart of a fluid bypass method for controlling the temperature of a non-petroleum fuel provided in the first embodiment.

FIG. 1B illustrates a flowchart of the method for controlling the temperature of the non-petroleum fuel that comprises one or more of the following steps 1-5 (S1-S5), as follows:

Step 1 (S1): a fuel is provided at the pressure sufficient to effect a desired flow rate to a vehicle, e.g., to supply the fuel to the vehicle. The fuel is at a liquid or substantially supercritical thermodynamic state requiring further heat addition in a vaporizer through a process generally known as vaporization.

Step 2 (S2): a first portion of the fuel is diverted in a bypass line as a bypass stream around the vaporizer.

When the non-petroleum fuel is liquid hydrogen, in some embodiments, the fraction of the first portion of the fuel is in the range of 5% to 95%, such as 5%, 15%, 25%, 35%, 45%, 55%, 65%, 75%, 85%, 95%, preferably, in the range of 10% to 70%, such as 10%, 20%, 30%, 40% 50%, 60%, 70%; and most preferably, in the range of 15% to 40%, such as 15%, 20%, 25%, 26%, 27%, 29%, 30%, 40%.

Step 3 (S3): the remainder of the fuel is provided as a second portion of the fuel to the vaporizer, where steam, electric, gas, ambient air or other heating source is used to heat and vaporize the second portion of the fuel.

In some embodiments, after passing through the vaporizer, the temperature of the second portion of the fuel is increased, while the pressure is substantially unchanged. It's preferred the temperature of the vaporized second portion of the fuel is in the range within 10-20° C. of the ambient temperature, e.g. −20° C. to 20° C.

In other embodiments, the first portion of the fuel diverted in the bypass line can be a mixture of non-petroleum fuel having partial or no vaporization to help regulate temperature of the bypass stream. For example, if the bypass stream is taken entirely upstream of the vaporizer, then the bypass stream has no vaporization. However, in order to increase the temperature of the bypass stream, the first portion can include non-petroleum fuel that has been at least partially vaporized in the vaporizer, e.g., taken at a point-midway in the vaporizer, as further discussed below.

Step 4 (S4): the second portion of the fuel from the vaporizer is mixed with the bypass stream to form a combined fuel stream, e.g., the second portion of the fuel from the vaporizer is mixed with the first portion of the fuel from the bypass line.

When the non-petroleum fuel is, for example, liquid hydrogen, the temperature of the combined fuel stream is in the range of −15° C. to 20° C., such as −15° C., −10° C., −5° C., 0° C., 5° C., 10° C., 15° C., 20° C., preferably, in the range of −5° C. to 10° C., such as −5° C., −2° C., 0° C., 2° C., 7° C., 10° C., and most preferably, in the range of −3° C. to 5° C., such as −3° C., −1° C., 0° C., 1° C., 2° C., 3° C., 4° C., 5° C.

Step 5 (S5): the combined fuel stream is then provided to a vehicle for filling via a dispensing system.

When the filling of the vehicle is close to being completed to the target density at the target pressure and temperature, before finishing the filling, the fuel in the bypass line is allowed to equalize with the desired values of the dispensing system. Proper operation is handled at the end of the filling to depressurize the hose and disconnect it from the vehicle to minimize venting. For example, any remainder in the fuel in the lines are returned to the storage system or flushed with an appropriate inert gas, e.g., nitrogen, argon, etc.

Figure 2:
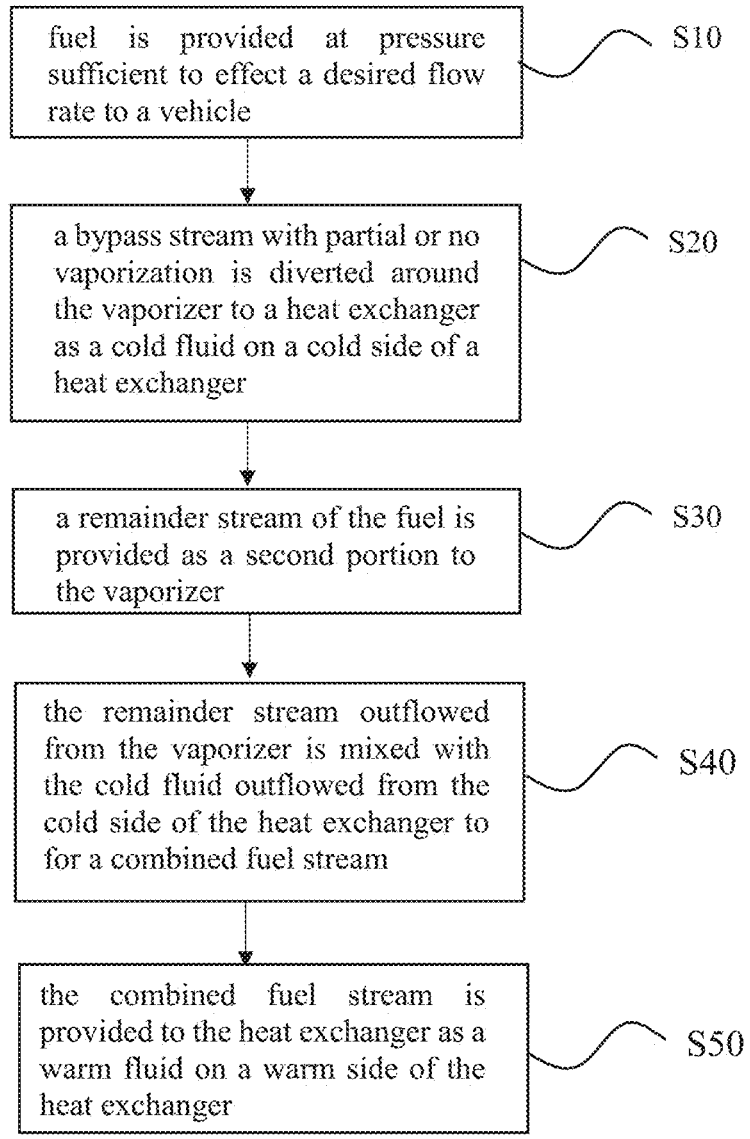
FIG. 2 is a flow chart of a fluid bypass method for controlling the temperature of a non-petroleum fuel provided in a second embodiment.

FIG. 2 illustrates a flowchart of another embodiment of a method for controlling the temperature of a non-petroleum fuel, e.g., liquid hydrogen or liquified natural gas, provided by some embodiments, which can not only achieve the desired temperature, but can also achieve temperatures of combined fuel streams that are not as detrimental to the flow meter, the controller, and other components within the dispenser, where temperature fluctuations of such components is one of the root causes of many premature failures of such components. For example, when there are long periods of no activity at the fueling station, the components warm up and experience thermal cycling when introduced to such cold temperature fuel streams which can lead to accelerated failures and leaks in the piping. Initially, the method includes detecting the type of vehicle for refueling by a dispenser of the refueling station, e.g., RFID, wireless, IR sensor, QR Code, scanner, I/O module, etc., or inputted by the driver of the vehicle in a keypad or the like so that the required temperature and pressure for receiving a non-petroleum fuel are determined.

For example, the desired dispensing fuel temperature (e.g., fuel temperature setpoint) entering the vehicle is in the range of −50° C. to 30° C., such as −50° C., −30° C., −15° C., 0° C., 10° C., 20° C., 30° C., preferably, in the range of −40° C. to 0° C., such as −40° C., −20° C., −5° C., 0° C., and most preferably, the desired dispensing fuel temperature entering the vehicle is in the range of −40° C. to −20° C., such as −40° C., −35° C., −30° C., −25° C., −20° C., which is of course dependent on the type of non-petroleum fuel and the vehicle.

The desired vehicle pressure is in the range of 20 MPa to 100 MPa, such as 20 MPa, 40 MPa, 60 MPa, 80 MPa, 100 MPa, and is preferably in the range of 35 MPa to 70 MPa, such as 35 MPa, 45 MPa, 55 MPa, 65 MPa, 70 MPa.

The method for controlling the temperature of the non-petroleum fuel then comprises one or more of the steps 10-50 (S10-S50), as follows:

Step 10 (S10): a fuel is provided at the pressure sufficient to effect a desired flow rate to the vehicle, e.g., to supply the fuel to vehicle. The fuel is at a liquid or substantially supercritical thermodynamic state requiring further heat addition in a vaporizer through a process generally known as vaporization.

Step 20 (S20): a first portion of the fuel is diverted in a bypass line around the vaporizer as a bypass stream to a downstream heat exchanger and provided as the cold fluid on the cold side of the heat exchanger.

When the non-petroleum fuel is liquid hydrogen, in some embodiments, the fraction of the first portion of the fuel is in the range of 5% to 95%, such as 5%, 15%, 25%, 35%, 45%, 55%, 65%, 75%, 85%, 95%, preferably, in the range of 10% to 70%, such as 10%, 20%, 30%, 40% 50%, 60%, 70%; and most preferably, in the range of 15% to 40%, such as 15%, 20%, 25%, 26%, 27%, 29%, 30%, 40%.

Step 30 (S30): the remainder of the fuel is provided as a second portion of the fuel to the vaporizer, where steam, electric, gas, ambient air or other heating source is used to heat and vaporize the second portion of the fuel.

In some embodiments, after passing through the vaporizer, the temperature of the second portion of the fuel is increased, while the pressure is substantially unchanged. It's preferred the temperature of the vaporized second portion of the fuel is in the range within 10-20° C. of the ambient temperature, e.g. −20° C. to 20° C.

In other embodiments, for example, during the startup sequence, the bypass stream with a large volume is allowed to bypass the vaporizer and flow through a heat exchanger and then mixed with the heated fuel from the vaporizer to form the combined fuel stream for a dispensing flow. The fuel, e.g., hydrogen, leaving the vaporizer is then able to be quickly cooled down to meet the temperature setpoint.

In some embodiments, for example in the later part of the fill sequence, as the system's pipes cool down, the bypass stream with a smaller volume will be needed to maintain the fuel temperature setpoint, and as the fluid properties of the fuel change, the heat transfer performance of the heat exchanger will change which will require the bypass stream flow rate to be controlled to maintain the fuel dispensing temperature setpoint. It's understandable the volume of the bypass stream is determined based on the temperature setpoint, the ambient temperature, and/or the temperature of pipes, etc.

In yet other embodiment, the first portion of the fuel diverted in the bypass line can be a mixture of non-petroleum fuel having partial or no vaporization to help regulate temperature of the bypass stream. For example, if the bypass stream is taken entirely upstream of the vaporizer, then the bypass stream has no vaporization. However, in order to increase the temperature of the bypass stream, the first portion can include non-petroleum fuel that has been at least partially vaporized in the vaporizer, e.g., taken at a point-midway in the vaporizer, as further discussed below.

Step 40 (S40): the second portion of the fuel from the vaporizer is mixed with the bypass stream from the cold side of the heat exchanger to form a combined fuel stream, e.g., the second portion of the fuel from the vaporizer is mixed with the first portion of the fuel from the heat exchanger.

In some of the embodiments, the temperature of the bypass stream outflowed from the cold side of the heat exchanger is higher than a temperature of the bypass stream on the upstream of the heat exchanger, and a temperature of the combined fuel stream is near ambient temperature.

When the non-petroleum fuel is, for example, liquid hydrogen, the temperature of the combined fuel stream is in the range of −15° C. to 20° C., such as −15° C., −10° C., −5° C., 0° C., 5° C., 10° C., 15° C., 20° C., preferably, in the range of −5° C. to 10° C., such as −5° C., −2° C., 0° C., 2° C., 7° C., 10° C., and most preferably, in the range of −3° C. to 5° C., such as −3° C., −1° C., 0° C., 1° C., 2° C., 3° C., 4° C., 5° C.

Step 50 (S50): the combined fuel stream is then provided to the heat exchanger as the warm fluid on the warm side of the heat exchanger, where the cold fluid on the cold side of the heat exchanger is the first portion of the fuel that was the diverted bypass stream which is mixed as part of the combined fuel stream.

When the filling of the vehicle is close to being completed to the target density at the target pressure and temperature, before finishing the filling, all the cold fuel in the bypass line is allowed to equalize with the desired values of the dispensing system. Proper operation is handled at the end of the filling to depressurize the hose and disconnect it from the vehicle to minimize venting. For example, any remainder in the fuel in the lines are returned to the storage system or flushed with an appropriate inert gas, e.g., nitrogen, argon, etc.

In the above method and steps, the ability to quickly control the temperature of the fuel stream is provided by controlling the amount of the cold fuel through the bypass line, which is controlled by operating the bypass control valve, e.g., proportion, proportional-integral, or proportional-integral-derivative controlled, to maintain the desired dispensing temperature setpoint of the dispensed fuel throughout the refueling, where the cold fuel is mixed with the heated fuel from the vaporizer, e.g., to result in ambient temperature hydrogen. For example, the cold fuel that is bypassed around the vaporizer is provided on the cold side of the heat exchanger to regulate the dispensing temperature for dispensing the fuel to the vehicle. The cold fuel is then recycled back into the main fuel stream to be mixed into the combined fuel stream for dispensing. Such a method allows automatic compensation for variations in climate conditions, time of year, time of day, and temperature of the system pipes and components based on the number and frequency of back-to-back fillings. The method also can be used to automatically change the dispensing temperature setpoint based on the vehicle tank size, detected vehicle specifications, grade (hydrogen grade can be final state of the filling or density) of fuel selected by the customer or other variables that may favor a final tank density, hydrogen filling time, or other parameters. The method is an improvement of the prior art, since it does not use a refrigeration system or require a large cold storage aluminum block, e.g., thermal storage block exchanger, which reduces the capital cost and operational cost of the hydrogen refueling station, and lowers the price of hydrogen to the customer.

Figure 3:
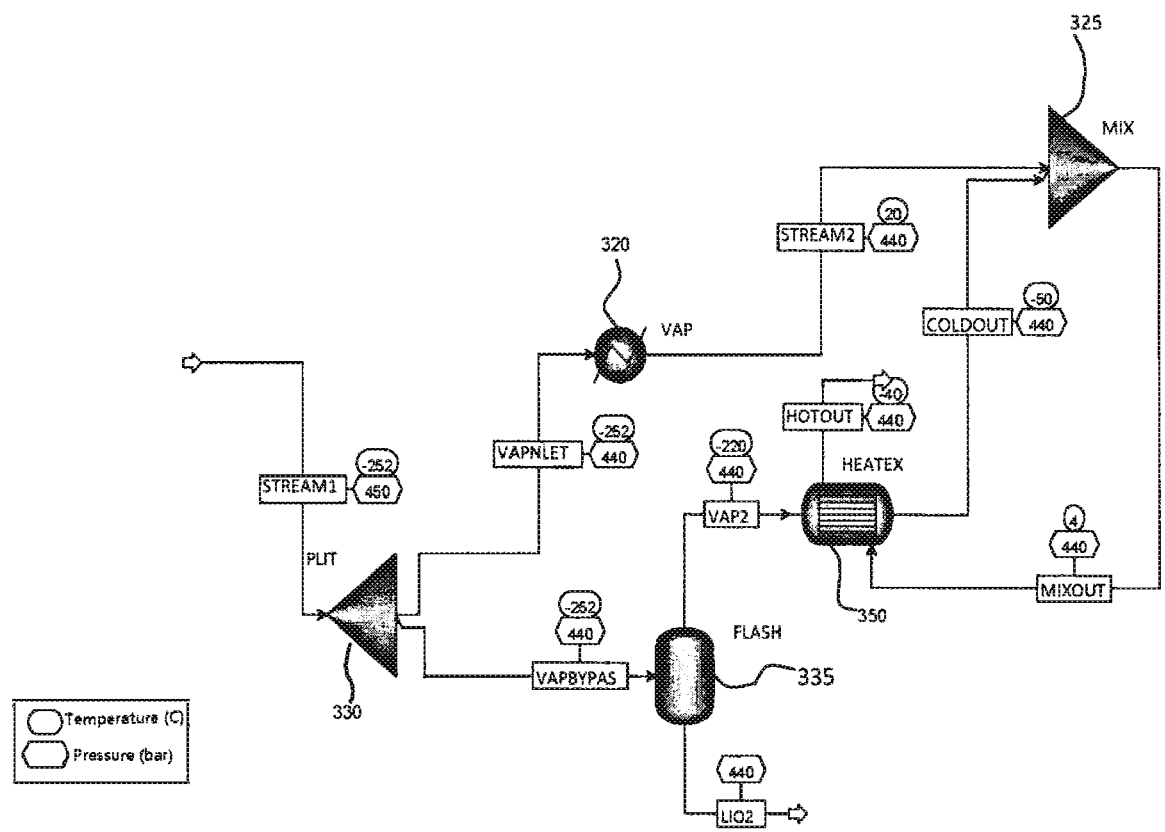
FIG. 3 is a flowsheet model simulation result provided by an embodiment.

FIG. 3 is a flowsheet showing the results from a simulation model provided by some embodiments. For example, a heat exchanger model is created to determine the detailed size and capacity requirements of the equipment for the refueling station. The model uses liquid, gaseous and supercritical hydrogen properties in accordance with National Institute of Science and Technology (NIST) standards to calculate the overall convection coefficient, specific heat flow, and recommended dimensions and geometry of the desired heat exchanger (HX).

As shown in FIG. 3, the model is used to complete a steady state simulation of the fluid bypass method for controlling the temperature of a non-petroleum fuel provided by some embodiments. The fuel in FIG. 3 is liquid hydrogen, and the method includes the following steps, e.g., simulated:

Step 10: a fuel is provided at 450 bar, −252° C., and the fuel is at a liquid/supercritical state requiring further heat addition in a vaporizer 320. The dispensing temperature of the hydrogen to the vehicle is determined as an equilibrium temperature with a target of −40° C., 440 bar to fill the vehicle. That is, the outlet temperature (HOTOUT) of the heat exchanger 350 is −40° C.

Step 20: through a bypass-valve 330, a bypass stream with no vaporization is provided to a flash tank 335 as a modeling aid to enforce numerical stability, and then to the downstream heat exchanger 350. The fuel dispensing process is then started, where the modeling is performed at a pressure of 440 bar.

Step 30: a remainder of the fuel is provided as a second portion to the vaporizer 320 at 440 bar.

Step 40: the bypass stream passed through the cold side of the heat exchanger 350 at −50° C. is mixed with the remainder of the fuel passed through the vaporizer 320 at mixer 325 at a temperature of 20° C. to form a combined fuel stream at a temperature of 4° C. (MIXOUT).

Step 50: the combined fuel stream is provided to the warm side of the heat exchanger 350 as a warm fluid, and the outlet temperature of the combined fuel stream is −40° C. (HOTOUT).

It can be seen from the simulated results that the method can be sized to achieve the desired results. Moreover, since the temperature of the combined fuel stream is 4° C. (MIXOUT) before entering the dispenser, the core of the dispenser having a flow meter and/or valves and/or other components, is not subjected to extreme cold temperatures and has less temperature fluctuations, which results in a less stressful temperature to the dispenser and components.

It is appreciated that further modeling can be performed to refine the dynamic response time and to determine capacity requirements for other embodiments, e.g., different fuels, different vehicles, etc.

Figure 4:
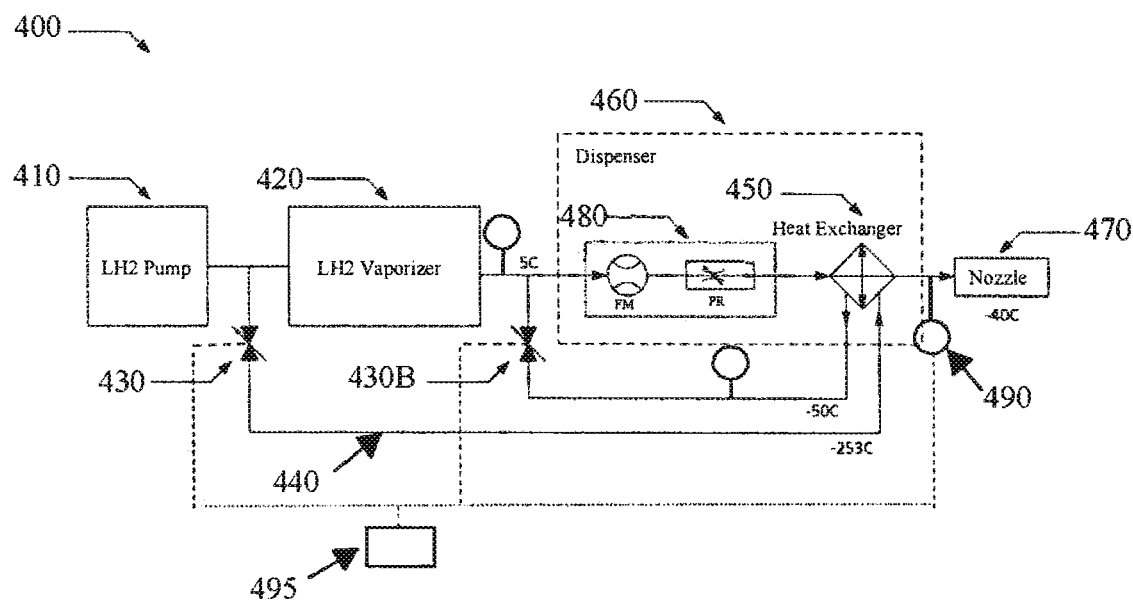
FIG. 4 is a schematic diagram of a system for controlling the temperature of a non-petroleum fuel provided by a third embodiment.

FIG. 4 illustrates another embodiment of a system for controlling the temperature of a non-petroleum fuel, where the fuel in FIG. 4 is liquid hydrogen.

As shown in FIG. 4, the system 400 includes a LH2 pump 410 configured to provide a fuel at a pressure sufficient to effect a desired flow rate to a vehicle, wherein the fuel is at a liquid or substantially supercritical thermodynamic state requiring further heat addition in a vaporizer 420 through a process generally known as vaporization, a bypass valve 430 configured to divert a bypass stream with partial or no vaporization through a bypass line 440 to a heat exchanger 450 as a cold fluid on the cold side of the heat exchanger 450, the vaporizer 420 is configured to receive the remainder of the fuel as a second portion of the fuel to vaporize using a heat source, wherein, the second portion of the fuel outflowed from the vaporizer 420 is mixed with the bypass stream outflowed from the heat exchanger to form a combined fuel stream, the combined fuel stream is then provided to the warm side of the heat exchanger as the warm fluid; wherein the cold fuel from the heat exchanger 450 from the diverted bypass stream is combined to form the combined fuel stream provided on the warm side of the heat exchanger 450, and a nozzle 470 configured to fill the vehicle with the hydrogen fuel.

In one embodiment, after the bypass stream is combined with the remainder of the fuel, e.g., second portion of fuel, from the vaporizer to form the combined fuel stream, the combined fuel stream is provided to a dispenser 460 for providing the fuel to the vehicle. The dispenser 460 comprises the heat exchanger 450, and optionally a group of various devices 480, for example, a flow meter, pressure reducer/regulator, temperature sensor, pressure sensor, etc. used for monitoring and controlling the dispensing of the fuel to the vehicle. A nozzle 470 is provided for dispensing the fuel to the vehicle.

In other embodiments, the bypass valve 430 between the LH2 pump 410 and the LH2 vaporizer 420 may be replaced with an alternative bypass valve 430B at the outlet of the heat exchanger 450 for controlling the flow rate and cooling rate of the heat exchanger 450. The ideal placement of the bypass valves 430/430B depends on the station-specific configuration which will not be limited in the present disclosure. For example, when the bypass valve 430B is located between the LH2 vaporizer 420 and the heat exchanger 450, the fuel stream has a warmer temperature (−50° C.) which applies less stress on the valve, therefore the reliability and service life of the valve are improved due to the reduction in thermal variation and thermal shock on the device. Accordingly, in some embodiments, only bypass valve 430B is used to control the diverting of the bypass stream for improved service life of the components since it is not subjected to the extreme cold temperatures of the liquid hydrogen from the supply source, e.g., LH2 pump 410, but warmed in the heat exchanger 450, where the bypass stream can comprise varying amounts of partially vaporized (or vaporized) fuel, i.e., depending on where the bypass stream is drawn off of at different stages or positions along the vaporizer.

Under normal operating conditions, the LH2 pump 410 supplies the fuel through the vaporizer 420 where the fuel vaporizes and enters the dispenser 460 at near ambient temperature. However, since the fuel must cool down to −40° C. before reaching the nozzle 470 for dispensing to the vehicle, the valve control unit 495 regulates the fraction of the fuel of hydrogen from the LH2 pump 410 to bypass the LH2 vaporizer 420 by opening the bypass valve 430 and/or 430B accordingly. The bypass stream flows through the bypass line 440 to the heat exchanger 450 and cools down the temperature of the combined fuel stream to the nozzle 470 to the desired dispensing temperature. The bypass stream is then recycled and mixed with the remainder of the fuel from the vaporizer 420 to form the combined fuel stream for dispensing (i.e., dispensing flow), which reaches an equilibrium point near 0° C. Therefore, not only is the desired dispensing temperature reached, an effective thermal protection is provided for the group of various devices 480 that are vulnerable to extreme thermal cycling. This temperature of the combined fuel stream entering the dispenser 460 (e.g. shown at 5° C. in FIG. 4) is not a tightly-controlled target, but is only meant to provide a relatively warm temperature range so that components within the dispenser 460 are not exposed to severe thermal temperature cycles.

Instead, the only tightly-controlled target temperature is the dispensing temperature at the nozzle 470, which is continuously controlled by the valve control unit 495. The valve control unit 495 maintains the dispensing temperature target at the setpoint by adjusting the flow rate, or alternatively the bypass fraction in the context of considering the total flow of the nozzle, through the bypass valve 430 (and/or 430B).

Accordingly, the valve control unit 495 is able to monitor the changing conditions, e.g., sensors measurements such as at temperature sensor 490, environmental or the temperature needs at the nozzle 470 in real time and constantly adjust the first portion of the fuel, e.g., bypass fuel, through the bypass valve 430 (and/or 430B).

When the non-petroleum fuel is liquid hydrogen, the heat exchanger 450 can be a recuperative heat exchanger, for example, the heat exchanger 450 is an aluminum core heat exchanger.

Figure 5:
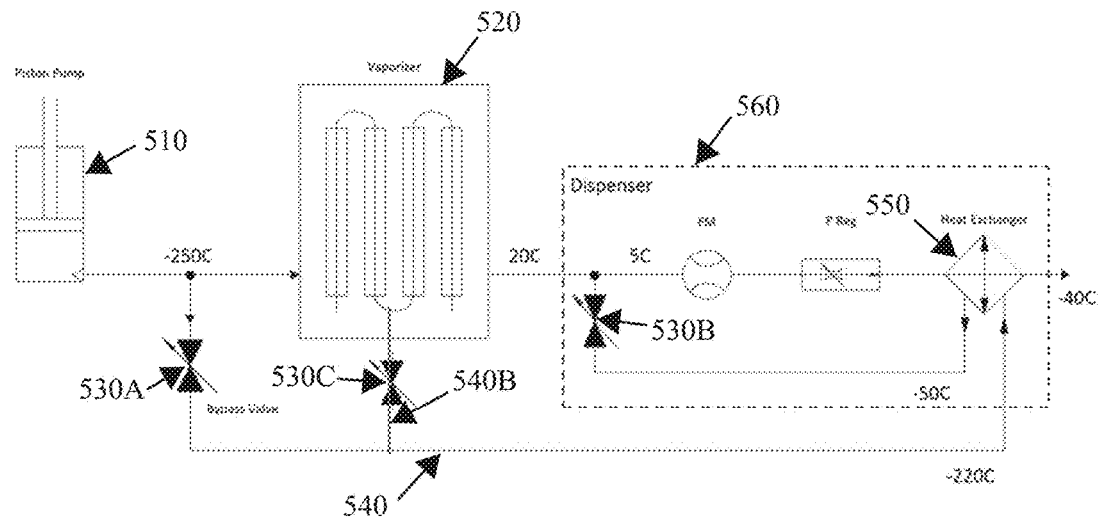
FIG. 5 is a schematic diagram of a system for controlling the temperature of a non-petroleum fuel provided by a fourth embodiment.

FIG. 5 is a system for controlling the temperature of a non-petroleum fuel provided by another embodiment, which has similar functions and constitution of FIG. 4, and is not repeated.

As shown in FIG. 5, the system includes a pump 510, a vaporizer 520, bypass valves 530A, 530B, and 530C, a dispenser 560, and bypass line 540B provided along any of the various points along the vaporizer 520. The vaporizer 520 comprises multiple series of heat transfer coils, where bypass line 540B of the vaporizer 520 can be provided to have different hydrogen temperatures, e.g., different amounts of vaporization depending on the stage or position taken off from the vaporizer. In this embodiment, depending on the dispensing temperature target requirement, a bypass line 540B with the highest hydrogen temperature, e.g., between −250° C. and 30° C., that meets the dispensing temperature target setpoint is selected to be further diverted in the bypass line 540 to reduce the temperature through the heat exchanger 550 which reduces the thermal stress on the piping and the heat exchanger network system. That is, in this embodiment, the bypass stream comprises a first portion of the fuel diverted around the vaporizer and at least part of the second portion of the fuel provided through the vaporizer which is warmer than the first portion of the fuel.

Figure 6:
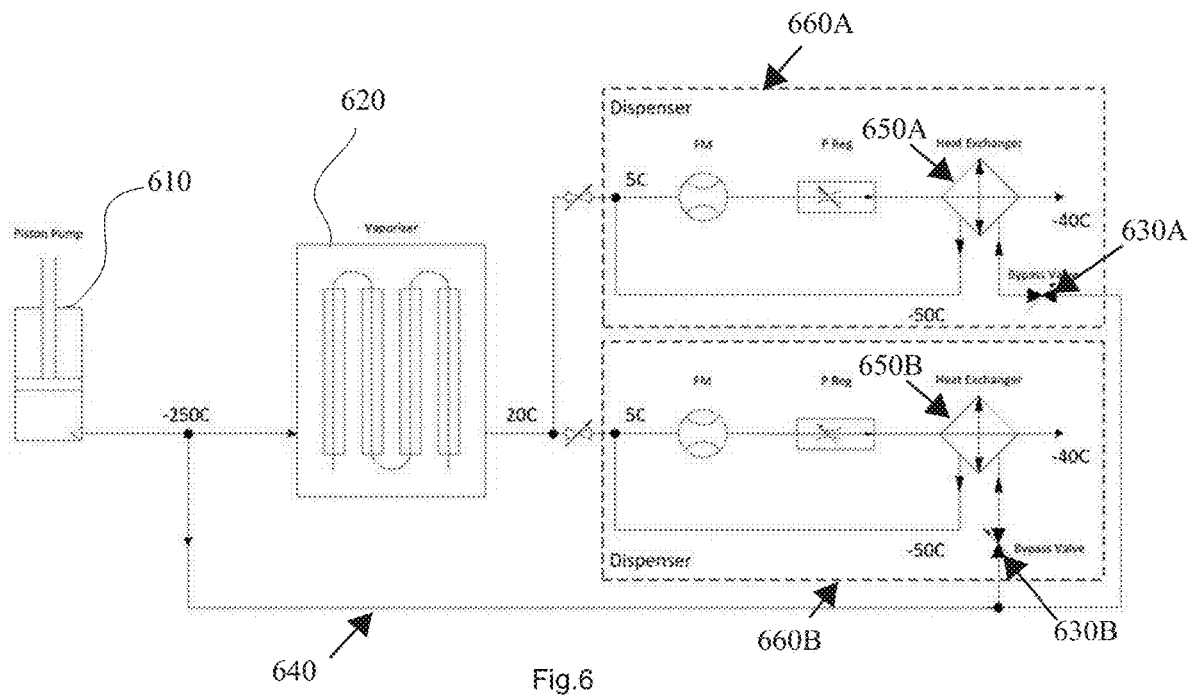
FIG. 6 is a schematic diagram of a system for controlling the temperature of a non-petroleum fuel provided by a fifth embodiment.

FIG. 6 is a system for controlling the temperature of a non-petroleum fuel in another embodiment, which also has similar features as illustrated in FIG. 4 and is not repeated herein.

As shown in FIG. 6, this system includes a pump 610 (which can be a piston pump), a vaporizer 620, bypass valves 630A and 630B, and two dispensers 660A and 660B. A single pump 610 and a single vaporizer 620 are used to supply the two dispensers 660A and 660B, where each dispenser is used to fill vehicles at different target temperatures and pressures. The bypass stream through the bypass line 640 is split into each dispenser 660A and 660B and is independently controlled by bypass valves 630A and 630B, respectively, where pressure control means, e.g., pressure regulator, within each of the dispensers 660A and 660B is used to control the respective nozzle pressure and their respective heat exchanger 650A and 650B and bypass control valves 630A and 630B are used to control the fuel dispensing temperature. For example, when both a light duty (nominally 70 MPa) and a medium or heavy duty (nominally 35 MPa) vehicle need to be filled at a same hydrogen refueling station, the system can meet such requirements by having the two dispensers 660A and 660B, where the pump 610 is capable of supplying fuel at the required pressure to meet the highest pressure demand.

While two dispensers 660A and 660B are illustrated, it is appreciated a plurality of dispensers can be used, where either the single pump 610 and the single vaporizer 620 are used to supply the plurality of dispensers or a plurality of pumps and/or vaporizers can be used to meet the system demand.

Furthermore, a computer readable storage medium that stores a computer program is provided, wherein, the aforementioned method including steps 1-50 are implemented when the computer program is executed by a processor on a computer.

This embodiment also includes a computer program product which is stored in a non-transitory computer readable medium, wherein, the computer program product includes a computer program including the method having the steps 1-50 which are implemented when the computer program is performed by a computer.

In order to illustrate the thermal management system, some examples as follows are provided.

EXAMPLE 1

Hydrogen at 450 bar and 20 K (−253° C.) is used to fill a substantially empty vehicle tank at 95 bar. In this case, 30% of the fuel stream is diverted as the bypass stream, and enters into the heat exchanger, after passing through the heat exchanger, the temperature of the bypass stream is −50° C. The remainder of the hydrogen fuel stream enters into the vaporizer. Then the bypass stream passing through the heat exchanger and the fuel stream passing through the vaporizer are mixed to form a combined fuel stream, where the temperature of the combined fuel stream is at −1° C., which is a comfortable temperature for a flow meter, controller and other components in the dispenser to avoid thermal shock and stress due to temperature fluctuations.

EXAMPLE 2

Hydrogen at 450 bar and 20 K (−253° C.) is used to fill a substantially empty vehicle tank at 195 bar, where 29% of the fuel stream is diverted as the bypass stream, and enters into the heat exchanger, after passing through the heat exchanger, the temperature of the bypass stream is −50° C. The remainder of the hydrogen fuel stream enters into the vaporizer. Then the bypass stream passing through the heat exchanger and the remainder of the fuel stream passing through the vaporizer are mixed to form a combined fuel stream, where the temperature of the combined fuel stream is at 0° C., which is a comfortable temperature for a flow meter, controller and other components in the dispenser.

EXAMPLE 3

Hydrogen at 450 bar and 20 K (−253° C.) is used to fill a substantially empty vehicle tank at 295 bar, where 27% of the fuel stream is diverted as the bypass stream, and enters into the heat exchanger, after passing through the heat exchanger, the temperature of the bypass stream is −50° C. The remainder of the hydrogen fuel stream enters into the vaporizer. Then the bypass stream passing through the heat exchanger and the remainder of the hydrogen fuel stream passing through the vaporizer are mixed to form a combined fuel stream, and the temperature of the combined fuel stream is at 1° C., which is a comfortable temperature for a flow meter, controller and other components in the dispenser.

EXAMPLE 4

Hydrogen at 450 bar and 20 K (−253° C.) is used to fill a substantially full vehicle tank at 395 bar, where 26% of the fuel stream is diverted to form a bypass stream, and enters into the heat exchanger, after passing through the heat exchanger, the temperature of the bypass stream is −50° C. The remainder of the hydrogen fuel stream enters into the vaporizer. Then the bypass stream passing through the heat exchanger and the remainder of the hydrogen fuel stream passing through the vaporizer are mixed to form a combined fuel stream, and the temperature of the combined fuel stream is at 2° C., which is a comfortable temperature for a flow meter, controller and other components in the dispenser.

EXAMPLE 5

Hydrogen at 450 bar and 20 K (−253° C.) is used to fill a substantially full vehicle tank at 435 bar, where 25% of the fuel stream is diverted as the bypass stream, and enters into the heat exchanger, after passing through the heat exchanger, the temperature of the bypass stream is −50° C. The remainder of the hydrogen fuel stream enters into the vaporizer. Then the bypass stream passing through the heat exchanger and the remainder of the hydrogen fuel stream passing through the vaporizer are mixed to form a combined fuel stream, and the temperature of the combined fuel stream is at 3° C., which is a comfortable temperature for a flow meter, controller and other components in the dispenser.

The fluid bypass method and the system for controlling the temperature of a non-petroleum fuel provided by the embodiments have the following advantages at least:

(1) Elimination of a separate cold thermal storage which reduces capital cost.

(2) Elimination of a refrigeration system which reduces capital and operational cost.

(3) Reduction of station equipment footprint.

(4) Improved hydrogen dispensing performance, faster cooling speed, controllable dispensing temperature, and flexibility of a setting of hydrogen dispensing temperature setpoint.

(5) Flexibility of filling vehicle tanks with any size. Dispensers require separate dispensing channels even within a single dispenser to offer dedicated 350 bar and 700 bar nozzles in the related arts. The present disclosure allows for each nozzle to fill 350 bar ambient temperature Medium Duty/Heavy Duty (MD/HD) vehicles and 700 bar Light Duty Vehicles (LDV) in a fast manner at dispensing temperatures of −40° C.

(6) Creates a near ambient temperature zone in the dispenser for flow meters, valves, filters, regulators and other instruments that may be sensitive to thermal cycles at temperatures down to −40° C. (MIXOUT in FIG. 3).

In the description of the above embodiments, the specific features, structures, materials or characters may be combined in any suitable manner in any one or more embodiments or examples.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A fluid bypass method for controlling temperature of a non-petroleum fuel, the method comprising the steps:
providing the non-petroleum fuel, said non-petroleum fuel being in a liquid or substantially supercritical thermodynamic state;
diverting a bypass stream of at least a first portion of the non-petroleum fuel having partial or no vaporization to a heat exchanger via a bypass line;
providing the bypass stream to a cold side of the heat exchanger;
providing a second portion of the non-petroleum fuel to a vaporizer, for heating the second portion in the vaporizer to provide a heated second portion;
mixing the heated second portion of the non-petroleum fuel from the vaporizer with the bypass stream from the heat exchanger to form a combined fuel stream;
providing the combined fuel stream to the heat exchanger on a warm side of the heat exchanger, to obtain a cooled combined fuel stream.

2. The fluid bypass method according to claim 1, wherein the non-petroleum fuel is liquefied natural gas, and the method further comprises a step of supplying the cooled combined fuel stream to at least one vehicle.

3. The fluid bypass method according to claim 1, wherein the non-petroleum fuel is liquid hydrogen, and the method further comprises a step of supplying the cooled combined fuel stream to the at least one vehicle.

4. The fluid bypass method according to claim 3, wherein a fraction of the bypass stream ranges from 5% to 95%.

5. The fluid bypass method according to claim 3, wherein a temperature of the combined fuel stream ranges from −15° C. to 20° C.

6. The fluid bypass method according to claim 3, wherein the heat exchanger is a recuperative heat exchanger.

7. The fluid bypass method according to claim 6, wherein the heat exchanger is an aluminum core heat exchanger, and the first portion is taken at a point midway in the vaporizer.

8. The fluid bypass method according to claim 1, wherein the pressure is a desired vehicle pressure ranging from 20 MPa to 100 MPa.

9. The fluid bypass method according to claim 1, wherein a dispensing temperature for dispensing the non-petroleum fuel into the at least one vehicle ranges from −50° C. to 30° C.

10. The fluid bypass method according to claim 1, wherein an amount of the second portion in the bypass stream is controlled with at least one controllable valve to maintain a dispensing temperature at a dispensing temperature setpoint for supplying the fuel to the at least one vehicle.

11. The method according to claim 10, wherein before the supplying of the fuel stream to the vehicle is completed, the bypass stream is equalized to a temperature equal to the dispensing temperature.

12. The method according to claim 1, further comprising the step of diverting at least a third portion of the fuel from the vaporizer to the bypass line, wherein said third portion is at least partially vaporized in the vaporizer.

13. The method according to claim 1, further comprising a step of supplying the cooled combined fuel stream to the at least one vehicle, and a step of providing the non-petroleum fuel to at least a second vehicle, wherein the diverted bypass stream is split into a first bypass stream and a second bypass stream, wherein said first bypass stream is diverted to the heat exchanger for cooling the combined fuel stream to the at least one vehicle and said second bypass stream is diverted to a second heat exchanger for cooling a second combined fuel stream to the second vehicle.

14. The method according to claim 1, further comprising a dispenser for supplying the cooled combined fuel stream to the at least one vehicle, said dispenser comprising a flow meter, a pressure regulator, a nozzle, and the heat exchanger.

15. A non-transitory computer readable storage medium that stores a computer program comprising the fluid bypass method for controlling the temperature of a non-petroleum fuel according to claim 1, which when executed by a processor, is implemented on a computer.

* * * * *